United States Patent [19]

DiBrino

[11] Patent Number: 5,379,434
[45] Date of Patent: Jan. 3, 1995

[54] APPARATUS AND METHOD FOR MANAGING INTERRUPTS IN A MULTIPROCESSOR SYSTEM

[75] Inventor: Michael T. DiBrino, Austin, Tex.

[73] Assignee: International Business Machines Corporation, Armonk, N.Y.

[21] Appl. No.: 258,127

[22] Filed: Jun. 10, 1994

Related U.S. Application Data

[63] Continuation of Ser. No. 993,173, Dec. 18, 1992, abandoned.

[51] Int. Cl.5 .............................................. G06F 13/26
[52] U.S. Cl. .................................. 395/725; 364/230.2; 364/280.8; 364/241.2; 364/241.3; 364/241.5; 364/259.2; 364/DIG. 1
[58] Field of Search ............... 395/725, 325, 650, 275, 395/800; 340/825.51; 370/85.6

[56] References Cited

U.S. PATENT DOCUMENTS

| | | | |
|---|---|---|---|
| 3,660,823 | 5/1972 | Recks | 340/146.2 |
| 4,268,904 | 5/1981 | Suzuki et al. | 364/200 |
| 4,271,468 | 6/1981 | Christensen et al. | 364/200 |
| 4,438,489 | 3/1984 | Heinrich et al. | 364/200 |
| 4,495,569 | 1/1985 | Kagawa | 364/200 |
| 4,633,394 | 12/1986 | Georgiou et al. | 395/650 |
| 4,644,465 | 2/1987 | Imamura | 364/200 |
| 4,769,768 | 9/1988 | Bomba et al. | 364/200 |
| 4,779,195 | 10/1988 | James | 364/200 |
| 4,796,176 | 1/1989 | D'Amico et al. | 364/200 |
| 4,833,598 | 5/1989 | Imamura et al. | 364/200 |
| 4,839,800 | 6/1989 | Barlow et al. | 364/200 |
| 4,930,070 | 5/1990 | Yonekura et al. | 364/200 |
| 4,959,781 | 9/1990 | Rubinstein et al. | 364/200 |
| 4,974,148 | 11/1990 | Matteson | 364/200 |
| 5,043,882 | 8/1991 | Ikeno | 364/200 |
| 5,099,414 | 3/1992 | Cole et al. | 395/200 |
| 5,125,093 | 6/1992 | McFarland | 395/725 |
| 5,179,707 | 1/1993 | Piepho | 395/725 |
| 5,210,871 | 5/1993 | Lala et al. | 395/650 |

FOREIGN PATENT DOCUMENTS

0348076A1 12/1989 European Pat. Off. .
0533361A1 3/1993 European Pat. Off. .

OTHER PUBLICATIONS

IBM Technical Disclosure Bulletin, vol. 27, No. 4B, Sep., 1984, "Interrupt Dispatching Method for Multiprocessing System", pp. 2356-2359.
Symmetry Technical Summary, copyright 1987 by Sequent Computer Systems, I Inc., Section 2.6 System Link and Interrupt Controller (SLIC), pp. 2-9 thru 2-11.

*Primary Examiner*—Gopal C. Ray
*Attorney, Agent, or Firm*—Casimer R. Salys

[57] ABSTRACT

A system and method for selecting a processor to service interrupts in a multiprocessor system with processor individualized interrupt priority states. The interrupt priority information associated with the various processors is bit serially compared to select one or more processors of lowest interrupt priority status, Processor individualized identification information is then compared to reconcile when multiple processors have an identical interrupt priority level, The outcome is stored and immediately available for managing interrupts generated by I/O devices, In a preferred arrangement, the interrupt priority status of the selected processor is confirmed immediately before processing the service requests to compensate for any changes occurring during the period of the bit serial comparison.

12 Claims, 11 Drawing Sheets

```
Time ─────▶

Processor 1   [0|0|1|1|1|1|0|0]    '3C'x

Processor 2   [1|0|1|1|0|1|0|1]    '85'x

Processor 3   [1|0|1|1|0|0|1|0]    'B2'x

Processor 4   [1|0|0|0|1|1|0|1]    '8D'x

Processor 5   [1|0|1|1|0|1|0|0]    'B4'x

Serial Bus    [1|0|1|1|0|1|0|1]    'B5'x

In Competition: 1
                2 2 2 2 2 2 2  ◄── Winner
                3 3 3 3 3
                4 4 4
                5 5 5 5 5 5 5
```

| | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Reset | | | | | | | | | | | | | | | | | | | |
| Start Competition | | | | | | | | | | | | | | | | | | | |
| Compete Cycle Latch | | | | | | | | | | | | | | | | | | | |
| Competition Counter | | 0 | 1 | 2 | 3 | 4 | 5 | 6 | 7 | 8 | 9 | A | B | 0 | 1 | | | | |
| Shift CPPR | 00 | A5 | 4A | 94 | 28 | 51 | A2 | 44 | 88 | 10 | 20 | 40 | 80 | | | | | | |
| Shift ID | 00 | 01 | 02 | 04 | 08 | 00 | 00 | 00 | 00 | 00 | 00 | 00 | 00 | | | | | | |
| Shift CPPR MSB | | 1 | 0 | 1 | 0 | 0 | 1 | 0 | 1 | 0 | 0 | 0 | 1 | | | | | | |
| Latch Out | | 1 | 1 | 0 | 1 | 0 | 0 | 1 | 0 | 1 | 0 | 0 | 0 | 1 | | | | | |
| Latch In | | | 1 | 0 | 1 | 1 | 0 | 1 | 1 | 1 | 1 | 1 | 0 | 0 | 1 | | | | |
| Latched OR Output | | | | X | X | X | X | X | X | X | X | X | X | X | X | X | | | |
| Input Latch | | | | | | X | X | X | X | X | X | X | X | X | X | X | X | | |
| Serial CPPR | 00 | | | | | | | | | | | | | | | | | | |
| Shadow CPPR/ID | 00 | | | | | | | | | | | | | | | | | | |

FIG. 12

APPARATUS AND METHOD FOR MANAGING INTERRUPTS IN A MULTIPROCESSOR SYSTEM

This is a continuation of application Ser. No. 07/993,173 filed Dec. 18, 1992, now abandoned.

CROSS-REFERENCE TO RELATED APPLICATIONS

This invention is related to the U.S. Pat. No. 5,265,215 issued Nov. 23, 1993.

BACKGROUND OF THE INVENTION

The present invention generally relates to the management of resources in a multiprocessor type computer system. More particularly, the invention is directed to the dynamic balancing of the workload in a symmetric multiprocessing system when responding to interrupt type service requests from input/output (I/O) devices.

The evolution of workstation and high-end personal computer (PC) technology has lead to multiprocessor computer architectures which are derivatives of base workstation or PC designs. In most respects, this simplifies the hardware development because fundamental elements of the individual processors already exist. In other respects, it complicates the multiprocessor system in that the communication between the interconnected processors must be managed and coordinated within the confines of the existing workstation and PC architectures. This management and coordination of multiple interconnected processors applies with equal importance not only to the execution of instructions but also to the processing of service requests initiated by interrupts, which interrupts may arise on any one of the I/O buses associated with each of the individual workstation or PC processor units. The objective is to have the interrupt serviced by the least busy of the multiple processors, where the least busy is preferably determined by comparing the priorities of ongoing processes in the various processors.

Given the significance of performance in contemporary multiprocessor systems, it is also important that the selection of the processor which is to service the interrupt be accomplished with minimum delay and with the least number of integrated circuit chip pins and wiring lines.

Since the interrupt priority of a processor is process dependent, changing with the application program or service code being executed by the processor at that time, processor architectures normally include registers which specify the existing priority level. For example, in the IBM Corporation PowerPC (TM) I/O architecture a current processor priority register (CPPR) designates in each processor the priority level associated with the instruction then in progress. The priority register is local to the associated processor, and therefore either resides on the CPU chip or an immediately adjacent support chip, such as a system control unit (SCU) chip. In an architecture involving multiple processors with individualized interrupt requesting I/O systems, the distance between the processors creates a potential latency in any comparisons of the priorities as reflected in the various registers. Therefore, the priority comparison following an interrupt is normally accomplished through the use of localized groupings of shadow registers or tables which track the priority information in the individualized current processor priority registers (CPPRs).

Though the use of shadow registers or tables eliminates communication delays in the priority comparison upon interrupt, the number of registers, the size of the comparison, the size of the bus interconnecting the registers, and the number of cycles needed to disseminate priority information, increase linearly with the number of processors and levels of priority. For example, with 16 processors, and an 8-bit priority code, the system requires 16 shadow registers of 8 bits each, a 16 way compare between the shadow registers, an 8-bit bus between the 16 processors, and an interval of at least 16 clock cycle to disseminate the priority data. As the number of processors increases, so do the number of registers and associated delays.

Two additional problems which detract from a bus interconnect architecture to communicate priority states are integrated circuit pin count limitations and clock frequency limitation for bus systems. As to the former constraint, the use of an 8-bit bus and related control lines would mandate the use of at least 10 pins to communicate with integrated circuit processor local priority registers. As to the latter, investigations have shown that buses exhibit transmission line characteristics as the signal frequencies increase. Problems such as reflection and impedance matching become more pronounced, and therefore more difficult and costly to manage, as frequencies exceed approximately 75 MHz. Together these limitations further negate a bus architected communication of the priority registers data.

Another technique practiced to reconcile interrupt priority in a multiprocessor system uses a line to bit serially broadcast a packet of interrupt information to the various processors upon the occurrence of a service request type interrupt. The processors individually and locally compare the states reflected in their individual interrupt priority registers to the priority defined by the interrupt request as specified in the packet. Processors of suitable priority level acknowledge acceptance simultaneously, which acknowledgements are then resolved when more than one processor responds. The particulars of whether the multiple acknowledgements can be timely resolved are not clearly disclosed.

Given the foregoing, there is a need for a system and method by which interrupts can be services by processors of selected priority in the context of a multiprocessor system and accomplished with minimum complexity and maximum timeliness. Timeliness is particularly important with high performance I/O devices, such as those managing video information, thus requiring a system which commences interrupt processing immediately after the receipt of the interrupt signal.

SUMMARY OF THE INVENTION

The present invention defines an apparatus for selecting a processor to service interrupts in a system having a plurality of processors with individual interrupt priority states, and so comprises a means for bit serially comparing interrupt priority information among the processors, and means for selecting a processor directly responsive to an interrupt using the results from the means for bit serially comparing. In another form, the invention relates to methods performed by the apparatus so defined.

According to a preferred practice of the invention, the time intervals between interrupts are used to repetitively compare processor interrupt priority information, as reflected in the current processor priority registers (CPPRs), and then identify the lowest priority processor for servicing interrupts. When more than one processor has the same interrupt priority level, numerically distinct processor identification information can be used to uniquely select a processor to service the interrupt. The selection of the unique processor, from multiples having the same priority level, can be accomplished by random, round robin, or fixed choice using processor identification numbers. A repetitive evaluation of processor status allows interrupts to be handled upon receipt, rather than following an interrupt initiated communication and priority comparison.

A preferred implementation involves a bit serial logical comparison of the data in current processor priority registers to ascertain the then lowest priority processor. Thereafter, a similar practice is applied to the processor identification numbers. The latter step ensures processor singularity when multiple processors exhibit equal priority. At the conclusion of each such repetitive cycle, not only is the selected lowest priority processor identified, but that identification is known locally by all the processors and the associated interrupt management resources of the system.

These and other features of the invention will be more clearly understood and appreciated upon considering the detailed embodiments which are described hereinafter.

BRIEF DESCRIPTION OF THE DRAWINGS

FIG. 12 is a timing relationship diagram for the operations performed in FIGS. 7–11.

DESCRIPTION OF THE PREFERRED EMBODIMENT

Figure 1:
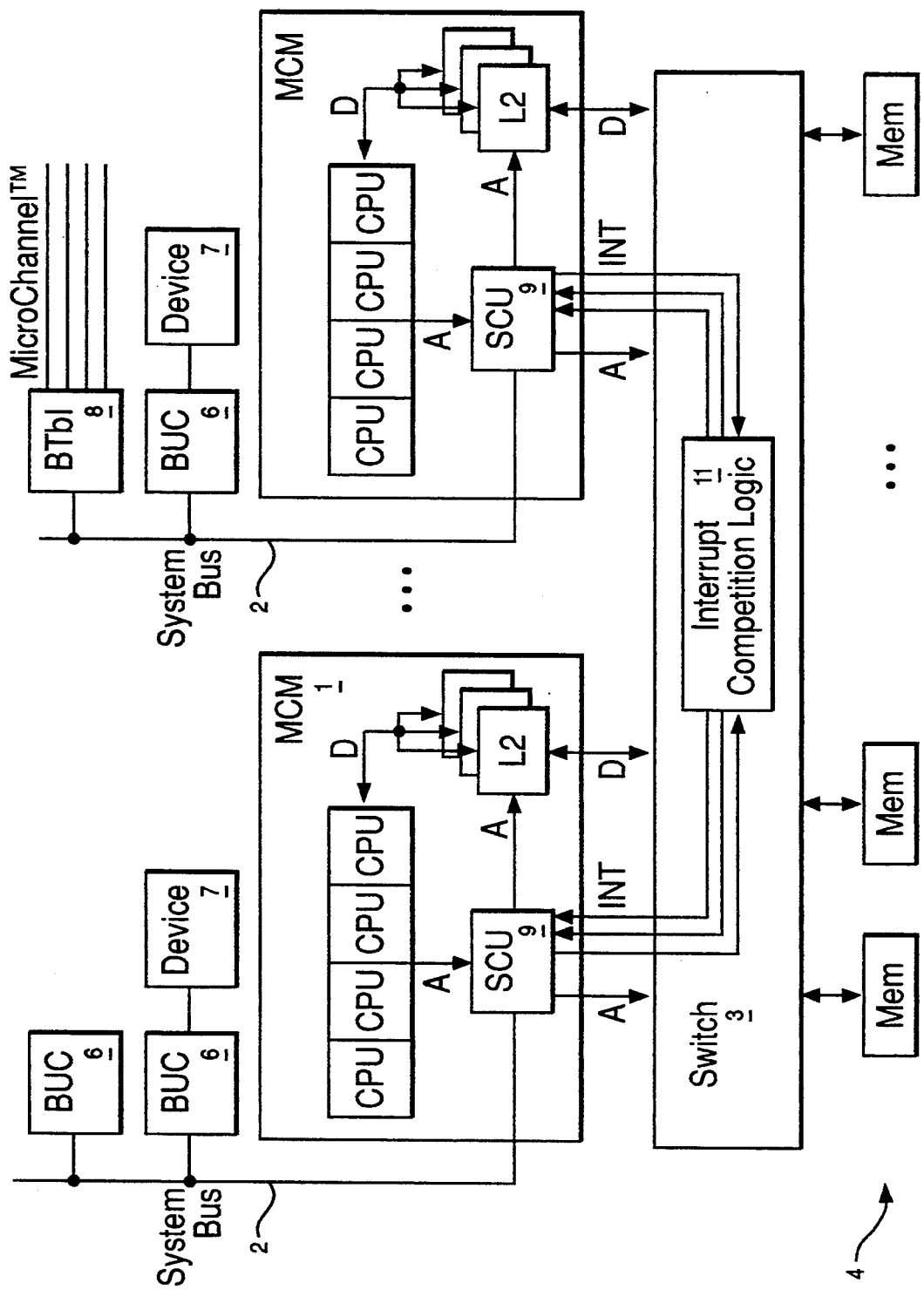
FIG. 1 is a schematic block diagram of a multiprocessor system.

FIG. 1 illustrates by schematic block diagram the architecture of a symmetric multiprocessor system suited to the practice of the present invention. The architecture is somewhat analogous to the SHARED MEMORY SYSTEM POWER/4 multiprocessor system commercially available from IBM Corporation. Accordingly, FIG. 1 involves the use of a RISC System/6000 type workstation (also available from IBM Corporation), or an equivalent, for each multichip module (MCM) 1 and related system bus 2. In the multiprocessor system of FIG. 1, each workstation equivalent is connected through a non-blocking switch 3 to a bank of shared global memory, generally at 4. Cache coherency is maintained by software. Each workstation equivalent system bus has connected thereto a multitude of bus unit controllers (BUCs) 6 and related I/O devices 7. The I/O devices generate service request type interrupts on their respective system buses. Also illustrated in FIG. 1 is bus-to-bus interface (BTBI) 8, an interface to multiple Microchannel (TM) I/O buses. All devices connected to system buses 2 are potential sources of interrupt signals. The problem, as noted earlier, is to select with minimum delay a processor, in this case a CPU, of a priority suitable to service the interrupt.

Each MCM 1 in FIG. 1 is shown to include four central processing units (CPUs), a system control unit (SCU) 9 and a bank of L2 level caches. The depiction of four generic CPUs is somewhat more general than in the above noted RISC System/6000, which system has three processors individually performing fixed point, floating point and branch processing. The inclusion of L2 level caches is likewise somewhat different. The present invention is described generally in the context of system in FIG. 1, and in particular as to the structures and operation in SCU 9 and interrupt competition logic 11.

According to a preferred practice of the invention, the interrupt priority driven processor selection is completed before the receipt of the I/O service request. In this context, the processor designated to service the I/O request is known before the interrupt occurs.

Figure 2:
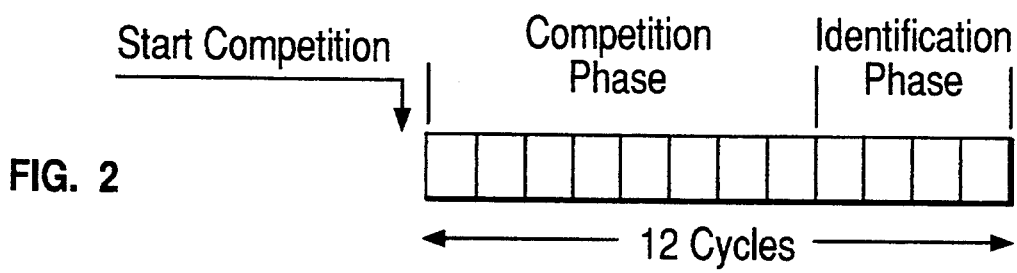
FIG. 2 is a schematic illustrating the relationship between the priority bits and processor individualized identification bits.

The processor selection is accomplished in two phases. The first phase involves bit serial competition or comparison of the processor priority data in the respective processor interrupt priority registers. It should be apparent that term bit serial comparison is meant to encompass not only bit by bit comparisons, but those accomplished in multiple bit increments where suitable. This phase is followed in direct succession by a processor unique identification phase, used to resolve priority level matches among processors. As illustrated with reference to FIG. 2, the embodiment involves the use of 8 interrupt priority bits, corresponding to 256 levels of interrupt priority, and four processor identification bits, suitable to distinguish between 16 processors. For this configuration, the interrupt priority is repetitively redefined every twelve or so master clock cycles, where a few clock cycles may be expended in latching delays between successive stages in the comparison logic.

Figure 3:
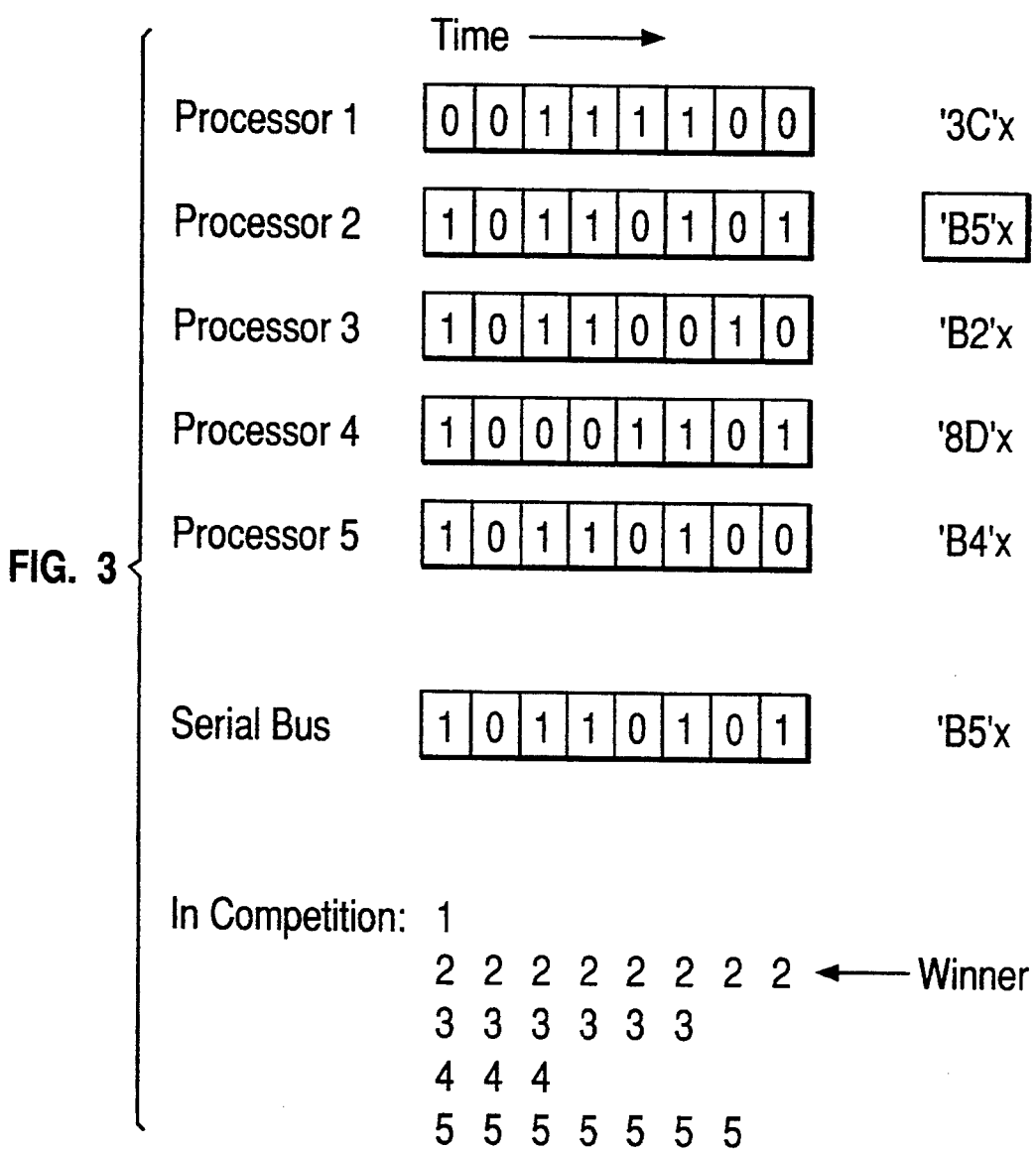
FIG. 3 is a schematic illustrating an example priority resolution.

FIG. 3 illustrates by specific numerical example a competition between five processors individually possessing an 8 bit interrupt priority. 00X represents the highest priority, while FFX represents the lowest priority. The goal is to identify the processor or processors having the lowest priority level. During the priority competition phase of FIG. 3, the processor bits are compared one per clock cycle. Furthermore, the outcomes of the comparisons are returned to the originating processors as information about the priority level of the lowest level processor being identified. When a processor determines, by a comparison of its bit to the bit returned, that a lower priority level processor exists, such processor removes itself from the successive competition. Therefore, as illustrated in FIG. 3, after the first comparison the first processor removes itself from the competition knowing that one or more processors have a lower priority. This removal from competition, until the next start competition cycle begins, is preferably accomplished by setting a competition latch state. As illustrated in FIG. 3, the competition proceeds by comparing the successive bit positions, from the most significant to the least significant, using only interrupt priority registers of processors which remain in the competition.

The identification phase works similar to the competition phase. This phase serves to select a single processor when multiple processors exhibit the same interrupt priority level. In this case, the comparison involves the use of processor unique identification information. As embodied, the processor having the highest numerical identification number is selected. Since the embodiment contemplates variations of the data in the identification register, the outcome can be changed to otherwise distribute the servicing tasks.

Figure 4:
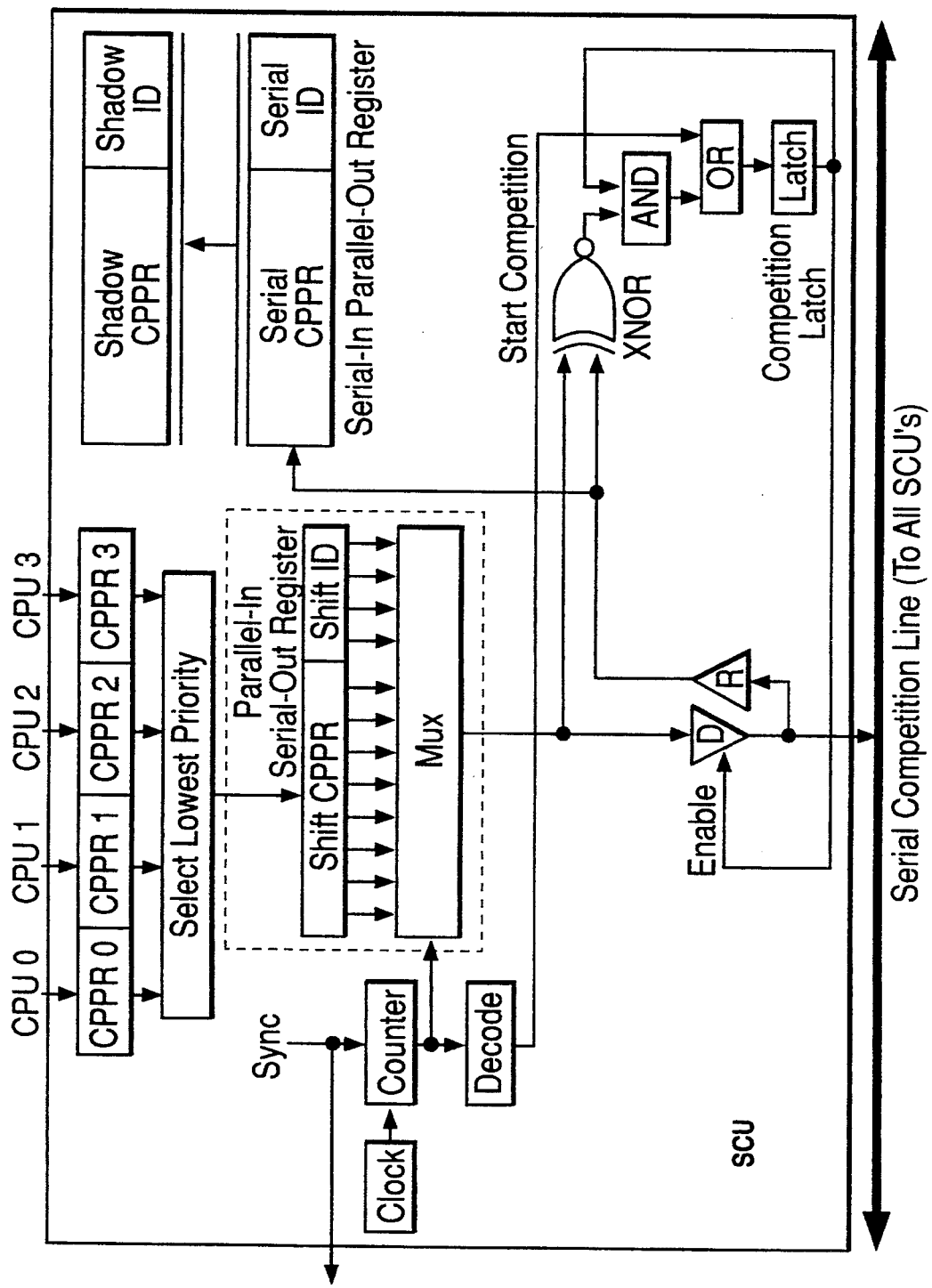
FIG. 4 is a schematic diagram of logic circuitry used to resolve interrupt priority among processors.
Figure 5:
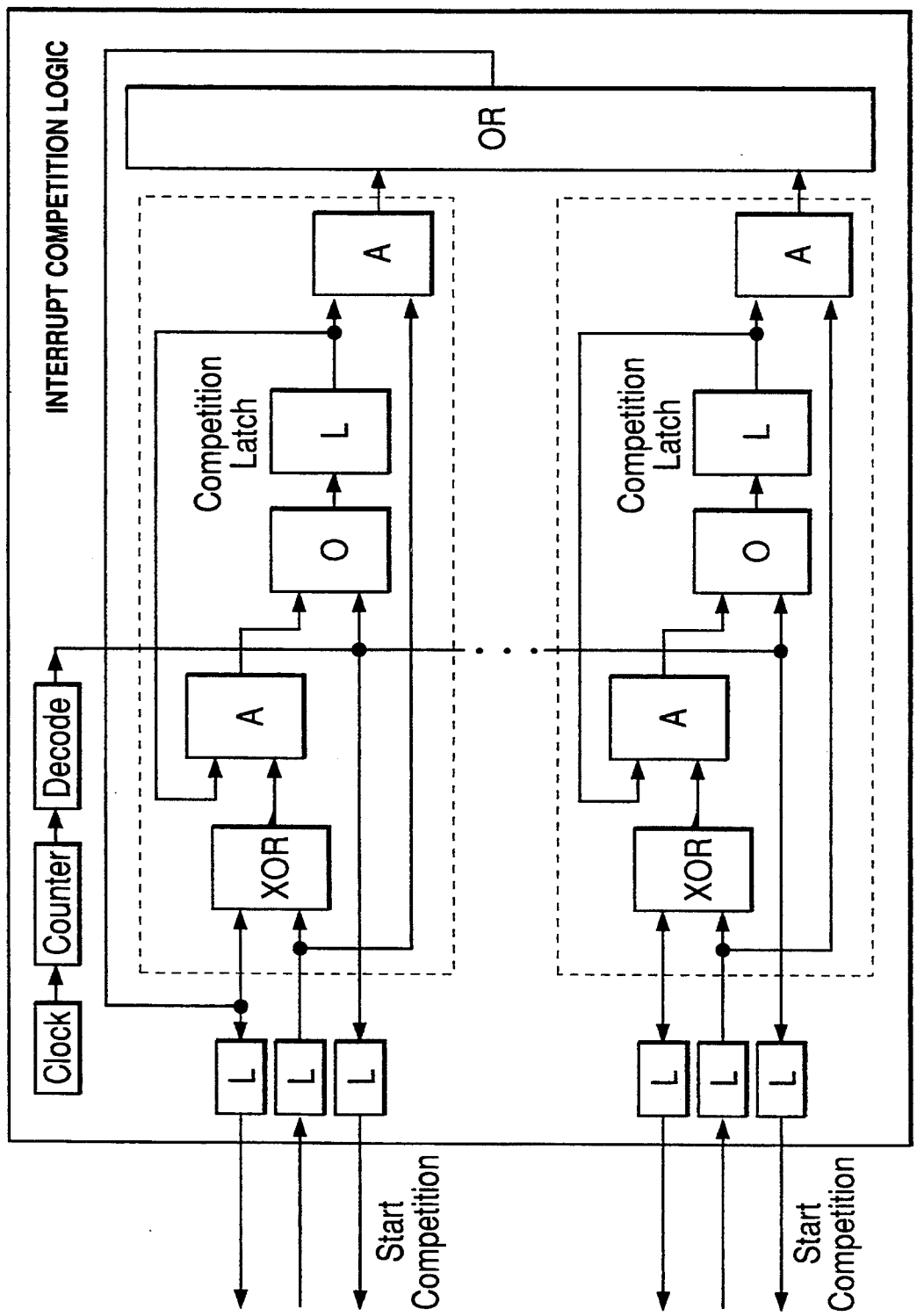
FIG. 5 is a schematic illustrating logic circuitry to do bit comparison.

A less preferred, arrangement accomplishes the comparison through the use of a single line bus with a pull-up resistor and open drain connections at each workstation equivalent. In this version, each processor asserts its priority value on the common line as represented by the state of the drain on the transistor connected to the shared line. Though functionally it performs the same logic operation, a Boolean logic OR, the distributed capacitance and inductance of the line which connects all workstation equivalents is likely to introduce a speed limitation inconsistent with the performance of contemporary multiprocessor systems. FIG. 4 illustrates the functional elements that would be in the SCU for this embodiment. Note that this embodiment needs only two lines, a synchronization for the start of competition, and the competition line itself. The identification of the lowest interrupt priority unit and its related interrupt priority level are derived directly by latching the bit position related state from the competition line. As shown in FIG. 5, shadow registers are used to allow changes to the CPPR and ID registers during the competition and identification comparison sequences.

In the preferred form, the bit position comparison is accomplished by logic circuitry such as that depicted in FIG. 5. Synchronization, the receipt of interrupt priority bit position information, and the return of lowest interrupt priority information, are accomplished through three lines connected to each workstation equivalent SCU (FIG. 1).

Figure 6:
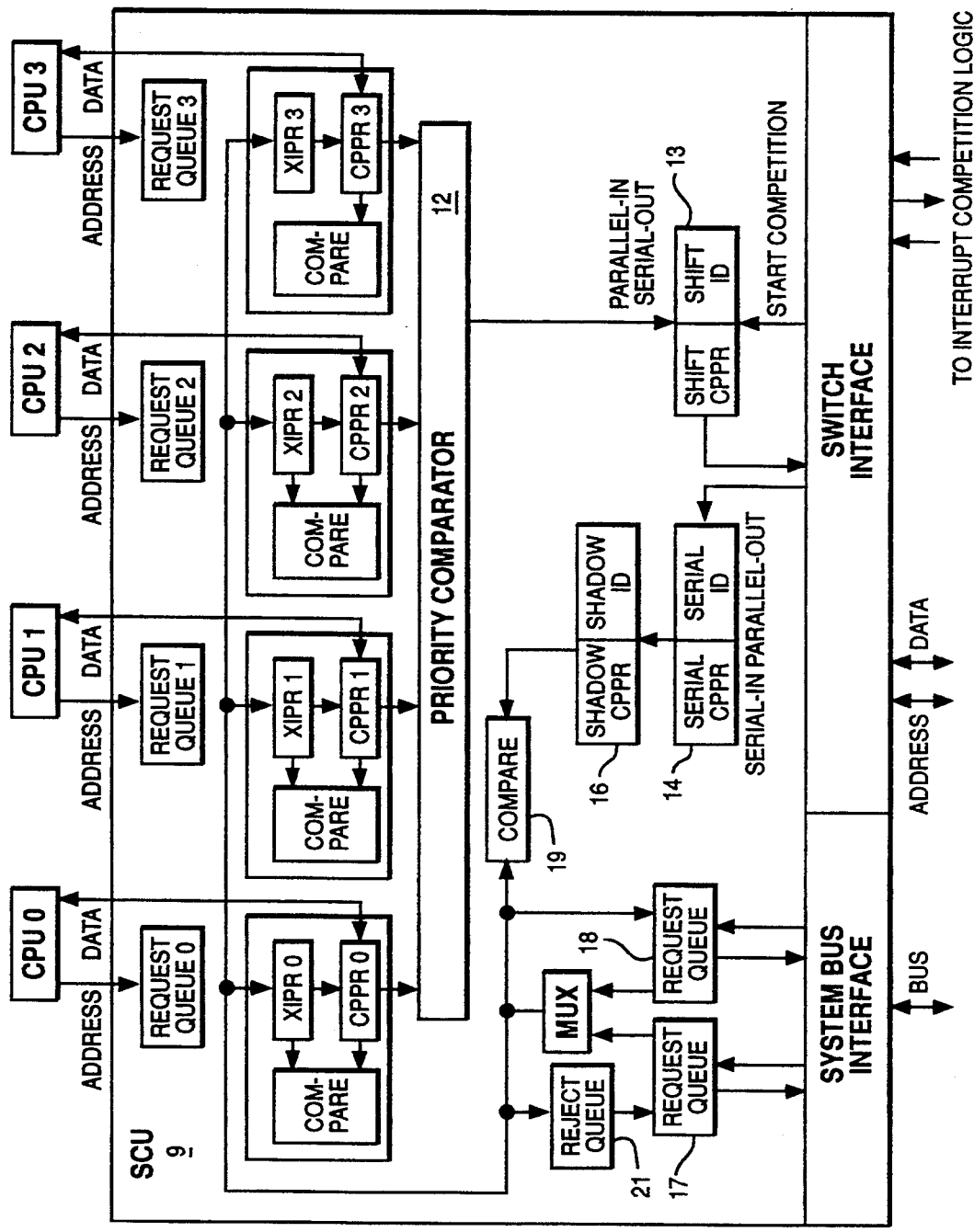
FIG. 6 is a schematic data flow diagram of a system control unit embodiment.

The preferred embodiment SCU, which uses the comparator in FIG. 5, is depicted in FIG. 6. The depiction of SCU 9 is in data flow format to more clearly relate the system elements to the methods defined by the flow diagrams in FIGS. 7-10. As shown in FIG. 6, each CPU has associated therewith an interrupt priority register to indicate the priority level for the process then in progress. The priority values in registers CPPR0–CPPR3 are compared in priority comparator 12 to identify the lowest priority for the set of four CPUs connected to each SCU 9. The minimum CPPR value and related processor ID for each SCU is stored in register 13. The outcome of an interrupt priority competition and related identification sequence, as described hereinbefore, is entered into register 14 and transferred for storage into shadow register 16.

An interrupt from an I/O device on the system bus local to the SCU is conveyed to request queue 17. In contrast, interrupts generated by an I/O device on the system bus of another SCU (FIG. 1) are entered through the switch interface and stored in request queue 18. Thereafter, one or the other of the requests is compared to the system minimum interrupt priority level for the related processor as stored in shadow register 16. If the compare performed in block 19 involves a request from the system bus of the local SCU as stored in request queue 17, and the outcome of the compare indicates that the request is of a lower interrupt priority than that stored in shadow register 16, the interrupt request is entered into reject queue 21 for eventual return to the system bus. Otherwise, the request is conveyed to the external interrupt pending registers (XIPRs) of the four CPUs.

Requests conveyed through the switch interface and request queue 18 are sent directly to the XIPR register corresponding to the CPU having the lowest interrupt priority level. If the corresponding XIPR register is full, the interrupt request is returned to either reject queue 21 or the switch interface for retransmission to the originating SCU.

Even if the interrupt request is entered into the XIPR register the interrupt request must still be recompared to the then existing CPPR register interrupt priority level, with potential rejection back to reject queue 21 or to the switch interface. This last compare is performed to ensure that the interrupt priority value has not changed as a consequence of processor activities over the preceding 12+ clock cycles expended during the competition and identification operations described earlier. In this way, the interrupt priority comparison is accomplished incrementally prior to the interrupt, and any unlikely, but possible, changes in the interrupt priority occurring during the competition and identification interval are confirmed immediately before the CPU is interrupted.

Figures 7, 8:
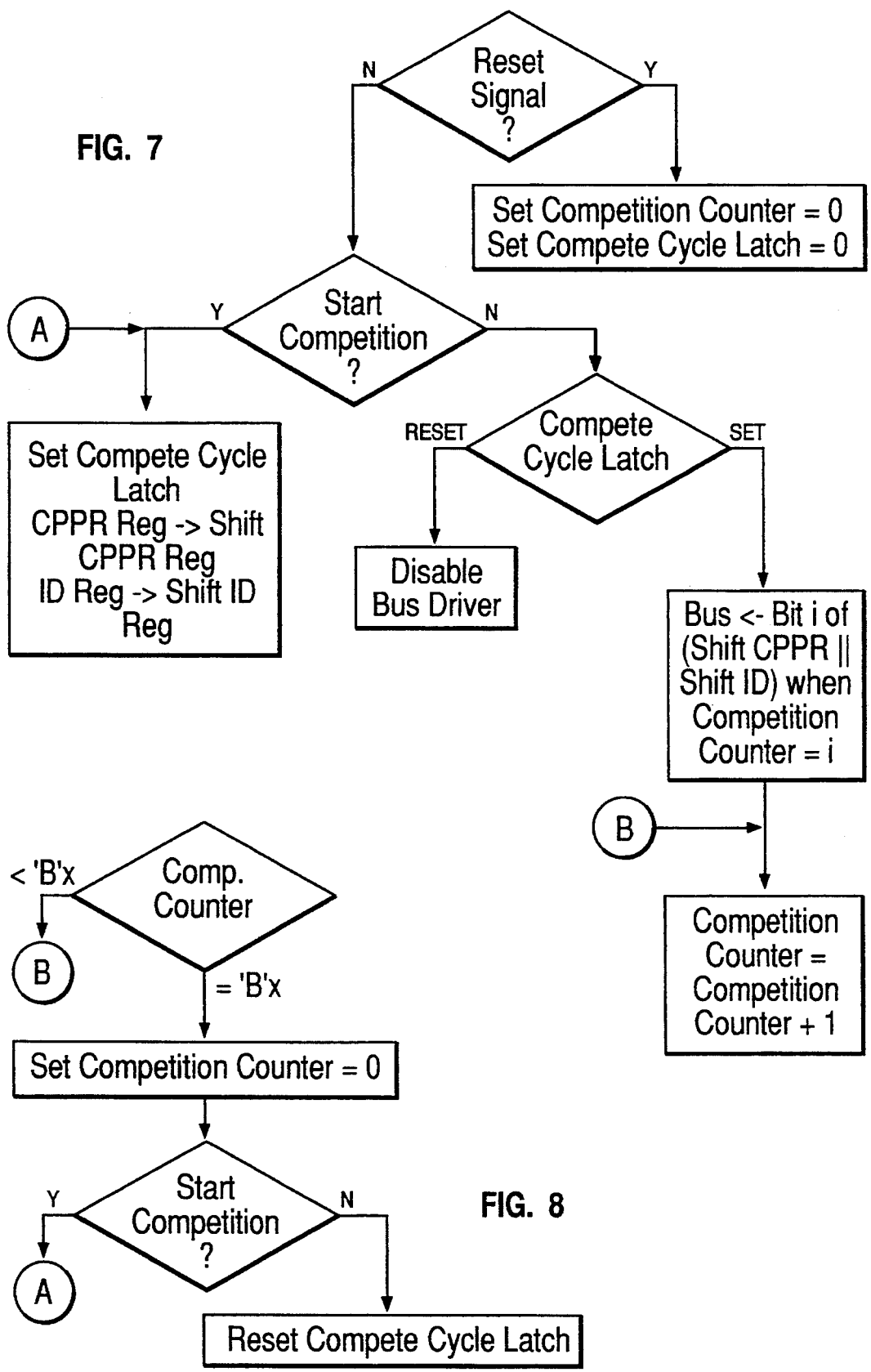
FIGS. 7–11 are flow diagrams of operations performed to determine an interrupt priority.
Figure 9:
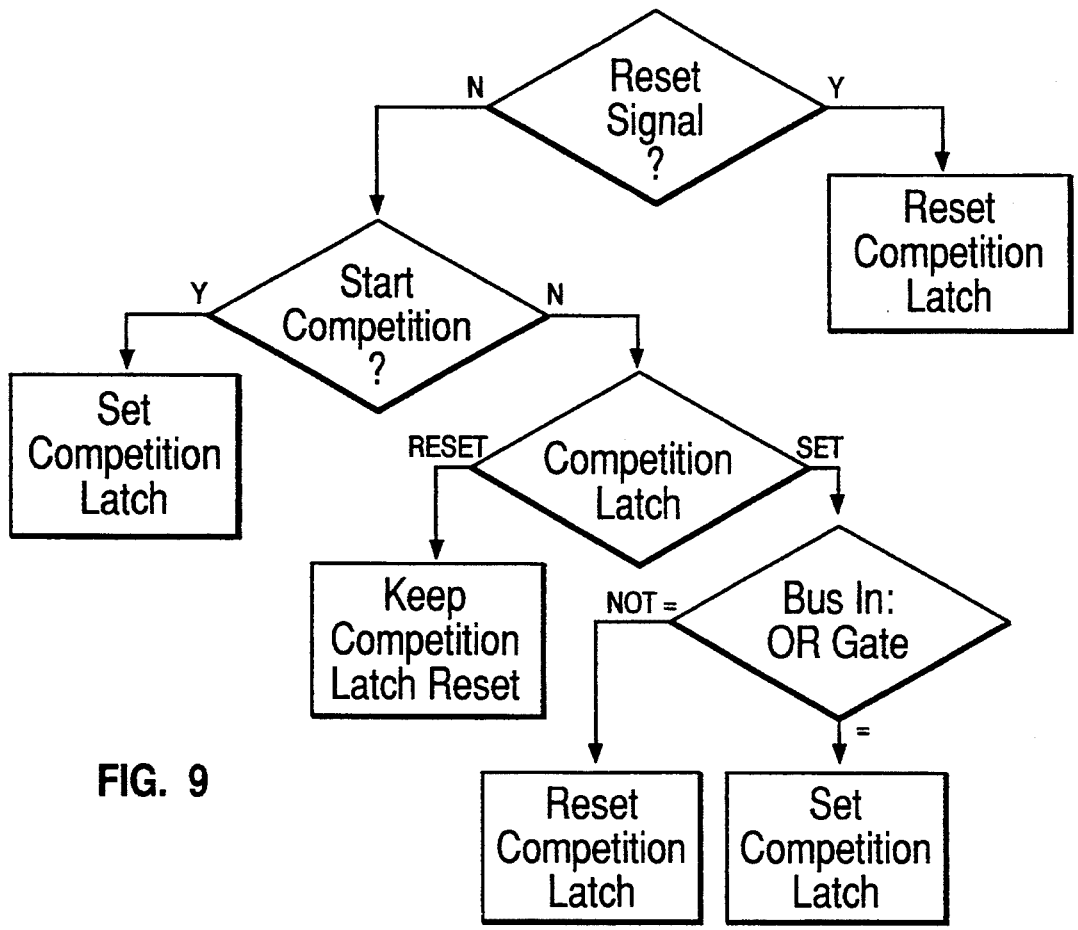
Figure 10:
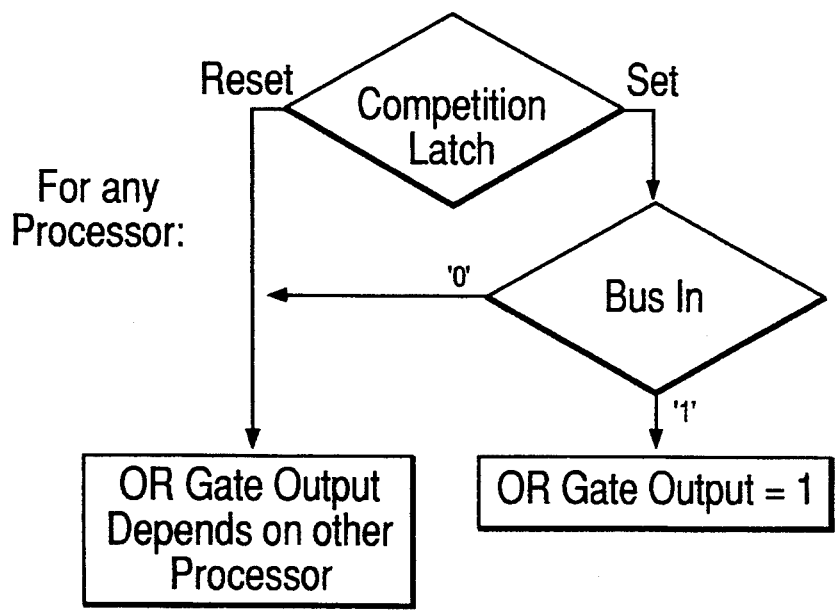
Figure 11:
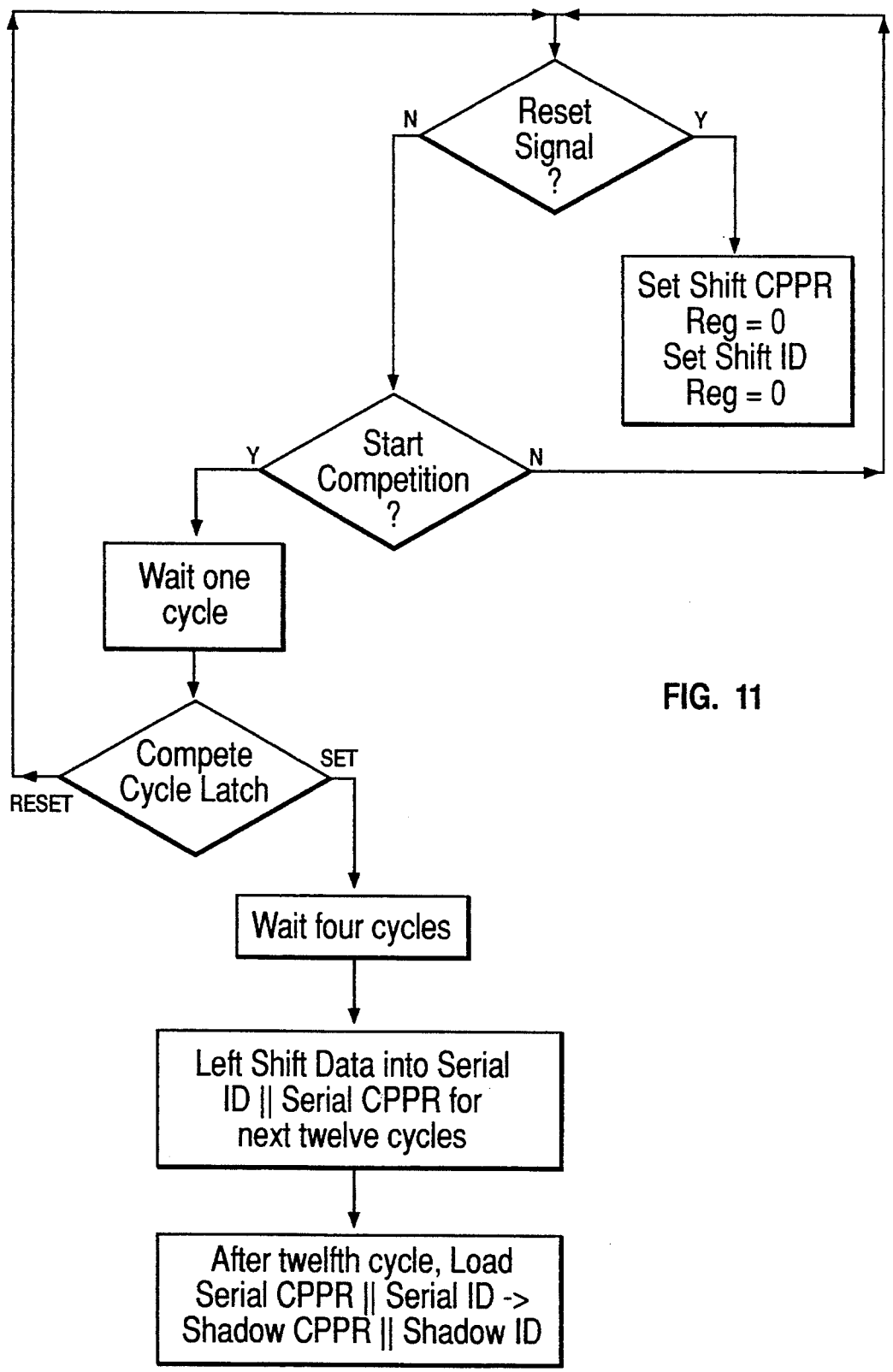
Figure 13:
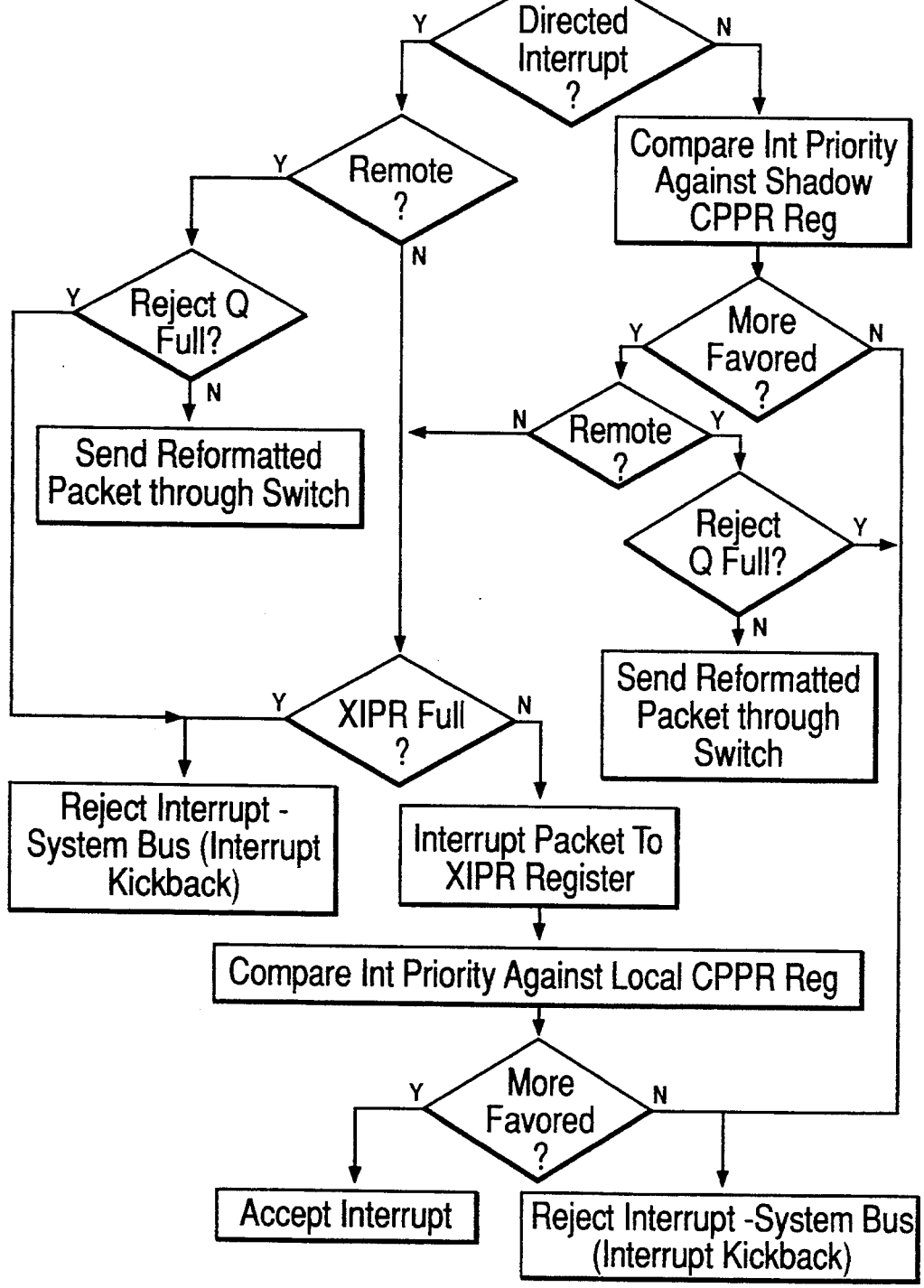
FIGS. 13–16 are flow diagrams of operations performed in response to an interrupt.
Figure 14:
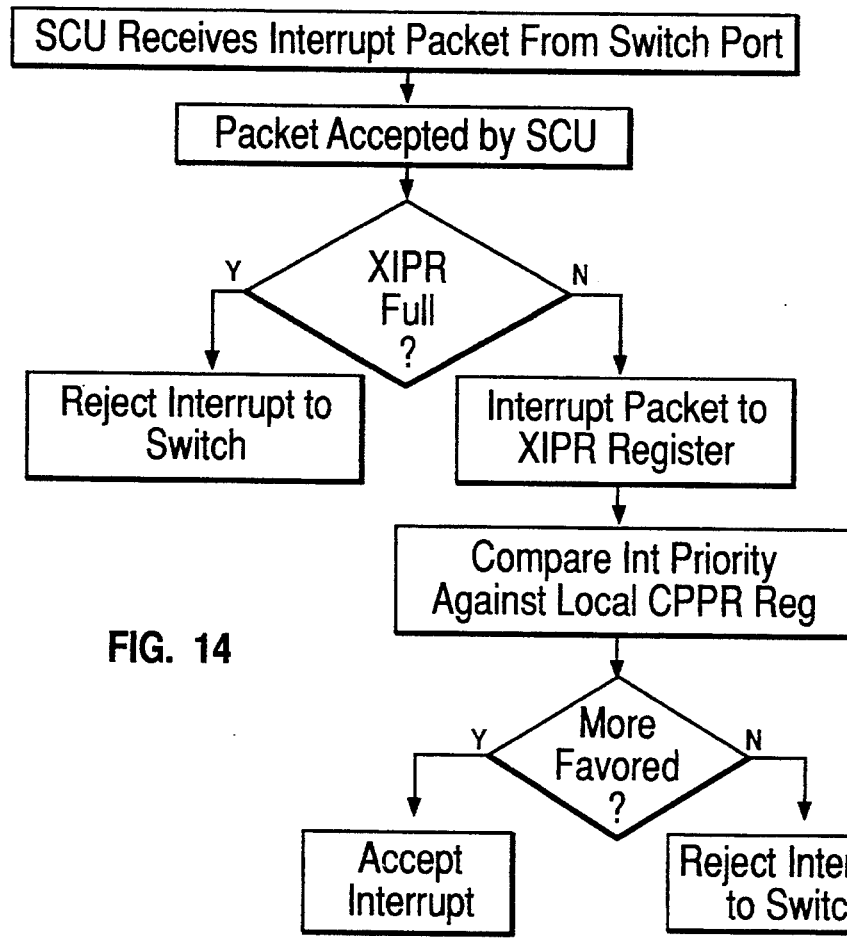
Figure 15:
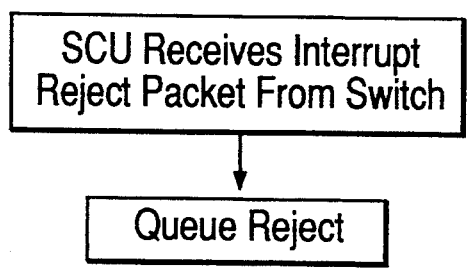
Figure 16:
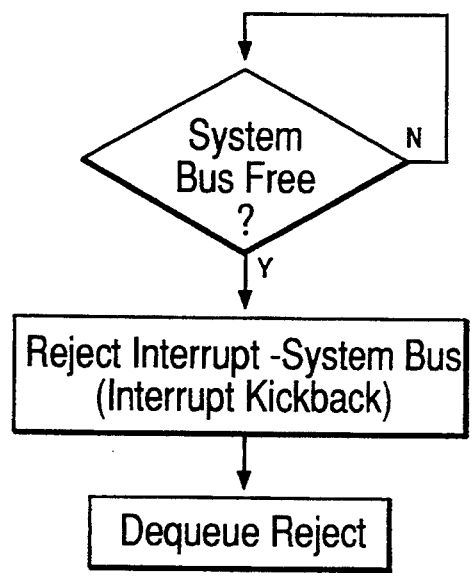

The operations depicted by flow diagram in FIGS. 7 and 8 are those undertaken to transmit interrupt competition information from SCU 9 (FIG. 6). FIGS. 9 and 10 represent the operations performed in the interrupt comparator logic of FIG. 5. The operations in FIG. 11 correspond to those accomplished upon the receipt of interrupt competition information into SCU 9 (FIG. 6). The timing diagram in FIG. 12 depicts the events, including integrated circuit chip boundary "Latch In" and "Latch Out" actions associated with the interrupt priority and processor individualized identification comparisons. Note the 12 clock cycle repetition rate of the competition.

FIGS. 13–16 depict the events associated with various of the functions performed in SCU 9 (FIG. 6) following the occurrence of an interrupt. The routing depicts the management of both accepted and rejected interrupts. The operations are identified by the blocks to which they relate.

Though the invention has been described and illustrated by way of specific embodiments, the systems and methods encompassed by the invention should be interpreted consistent with the breadth of the claims set forth hereinafter.

I claim:

1. Apparatus to select a processor for servicing interrupts in a system having a plurality of processors with individual interrupt priority information, comprising:
    means for bit serially comparing interrupt priority information among the processors, the comparison being done in repeated succession using bits of corresponding significance, connected to the plurality of processors; and
    means for selecting a processor of the plurality of processors to service an interrupt using priority results obtained from the comparison by the means for bit serially comparing.

2. The apparatus recited in claim 1, further comprising:
    means for using processor individualized identification information to select a processor.

3. The apparatus recited in claim 2, wherein the processor individualized identification information corresponds to processor serial numbers.

4. The apparatus recited in claim 3, further comprising:
means for confirming the selection of a processor by comparing priority results from the means for bit serial comparison to the interrupt priority information of a selected processor.

5. The apparatus recited in claim 4, wherein the means for bit serially comparing identifies one or more processors as having the lowest interrupt priority.

6. A method of selecting a processor for servicing interrupts in a system having a plurality of processors with individualized interrupt priority information, comprising the steps of:
bit serially comparing interrupt priority information among the processors, the comparison being done in repeated succession using bits of corresponding significance, connected to the plurality of processors; and
selecting a processor of the plurality of processors to service an interrupt using priority results obtained from the bit serial comparison.

7. The method recited in claim 6, comprising the further step of:
using processor individualized identification information to select a processor.

8. The method recited in claim 7, wherein the processor individualized identification information is used to make a selection by processor serial number.

9. The method recited in claim 8, further comprising the step of:
confirming the selection of a processor by comparing priority results from the bit serially comparing step to the interrupt priority information of a selected processor.

10. The method recited in claim 9, wherein the step of bit serially comparing identifies one or more processors as having the lowest interrupt priority.

11. A system with resources for servicing interrupts based upon a comparison of processor interrupt priority information, comprising:
a plurality of processors connected to service interrupts;
means for bit serially comparing interrupt priority information among the processors, the comparison being done in repeated succession using bits of corresponding significance, connected to the plurality of processors;
means for receiving an interrupt; and
means for selecting a processor of the plurality of processors to service the interrupt using priority results obtained from the comparison by the means for bit serially comparing.

12. The system recited in claim 11, further comprising:
means for using processor individualized identification information to assist in selecting a processor.

* * * * *